(12) United States Patent
Birk et al.

(10) Patent No.: US 8,978,583 B2
(45) Date of Patent: Mar. 17, 2015

(54) ANIMAL TREATING ARRANGEMENT

(75) Inventors: Uzi Birk, Huddinge (SE); Mats Nilsson, Tumba (SE); Gert Danneker, Grodinge (SE); Thomas Axelsson, Farsta (SE); Jan Eriksson, Uttran (SE)

(73) Assignee: Delaval Holding AB, Tumba (SE)

( * ) Notice: Subject to any disclaimer, the term of this patent is extended or adjusted under 35 U.S.C. 154(b) by 395 days.

(21) Appl. No.: 13/519,349

(22) PCT Filed: Feb. 8, 2011

(86) PCT No.: PCT/EP2011/051833
§ 371 (c)(1),
(2), (4) Date: Jun. 27, 2012

(87) PCT Pub. No.: WO2011/098454
PCT Pub. Date: Aug. 18, 2011

(65) Prior Publication Data
US 2012/0298043 A1    Nov. 29, 2012

Related U.S. Application Data

(60) Provisional application No. 61/304,956, filed on Feb. 16, 2010.

(30) Foreign Application Priority Data

Feb. 15, 2010 (SE) ........................ 1050146

(51) Int. Cl.
*A01J 3/00* (2006.01)
*A01K 1/12* (2006.01)

(52) U.S. Cl.
CPC ...................................... *A01K 1/126* (2013.01)
USPC ................... 119/14.04; 119/14.01; 119/14.03

(58) Field of Classification Search
CPC ............. A01J 7/04; A01J 5/017; A01J 7/025; A01J 5/00; A01J 7/00; A01J 5/003; Y10S 901/02; A01K 1/126; A01K 1/12; A01K 1/0041

USPC .......... 119/14.04, 14.01, 14.02, 14.03, 14.11, 119/14.18, 14.08
See application file for complete search history.

(56) References Cited

U.S. PATENT DOCUMENTS 3,835,814 A    9/1974   Jacobs et al.
4,508,058 A    4/1985   Jakobson et al.
(Continued)

FOREIGN PATENT DOCUMENTS

EP    0 900 522 A1    3/1999
EP    1 523 882 A2    3/2009
(Continued)

OTHER PUBLICATIONS

International—Type Search Report, dated Aug. 4, 2010, from corresponding PCT application.
(Continued)

*Primary Examiner* — Andrea Valenti
(74) *Attorney, Agent, or Firm* — Young & Thompson

(57) ABSTRACT

An animal treating arrangement includes a carrying device beside a milking platform rotating with a velocity and having animal places housing animals. The carrying device includes a fundament, a first bearing device (12) provided on the fundament, an arm (13) connected to the first bearing device permitting the arm to rotate in relation to the fundament around a first axis, a support platform (15) connected to the arm (13). A drive arrangement moves the support platform and includes a first drive member (31) rotating the arm around the first axis. A sensor (37) communicates with a control unit (36) and senses an instantaneous value of the velocity. The control unit controls the first drive member to move the support platform to follow the milking platform from a start position to an end position during a part of the rotation of the milking platform.

17 Claims, 4 Drawing Sheets

(56) References Cited

U.S. PATENT DOCUMENTS

| | | | |
|---|---|---|---|
| 5,042,428 A * | 8/1991 | Van der Lely et al. | 119/14.08 |
| 5,979,359 A * | 11/1999 | Hansson | 119/14.08 |
| 6,050,219 A | 4/2000 | van der Lely | |
| 2006/0111810 A1 | 5/2006 | Kim et al. | |
| 2006/0196431 A1 | 9/2006 | Kaever et al. | |

FOREIGN PATENT DOCUMENTS

| | | | |
|---|---|---|---|
| EP | 2 060 170 A1 | 5/2009 | |
| EP | 2 060 173 A1 | 5/2009 | |
| EP | 2 241 179 A1 | 10/2010 | |
| GB | 2 226 941 A | 7/1990 | |
| SU | 511919 A | 6/1976 | |
| SU | 649373 A | 2/1979 | |
| SU | 1281219 A2 | 1/1987 | |
| SU | 1777728 A1 | 11/1992 | |
| WO | 00/74472 A1 | 12/2000 | |
| WO | 2008/104416 A1 | 9/2008 | |
| WO | 2008/118068 A1 | 10/2008 | |
| WO | WO 2008/118068 * | 10/2008 | A01K 1/12 |
| WO | 2009/120129 A1 | 10/2009 | |
| WO | 2009/123956 A1 | 10/2009 | |

OTHER PUBLICATIONS

International Search Report, dated May 27, 2011, from corresponding PCT application.

Supplementary International Search Report, dated Feb. 24, 2012, from corresponding PCT application.

* cited by examiner

ANIMAL TREATING ARRANGEMENT

THE BACKGROUND OF THE INVENTION AND PRIOR ART

The present invention refers to an animal treating arrangement.

The invention is concerned with animal treating arrangements where the animals are entering and standing on a rotary platform, and where the treatment, including for instance milking, teat cleaning and/or teat spraying, is performed on the animals standing on the rotary platform. Such animal treating arrangements are advantageous since they enable treatment of a large number of animals during a relatively short period of time, i.e. with a high efficiency. It has been proposed already to combine such an animal treating arrangement with a milking robot for applying teatcups of a milking machine in an automatic manner on the teats of the animals standing on the rotary platform.

According to a first solution, it is possible to provide several milking robots on the platform, whereby the milking robots rotate with the platform. The disadvantage of this solution is that one milking robot is needed for each milking place. According to a second solution, the milking robot, or several milking robots, is provided beside the platform, whereby the milking robot, during the rotation of the platform, attaches the teatcups to the animal present at the animal place being located in front of the milking robot.

EP-A-1 523 882 discloses an animal treating arrangement according to the second solution. In the embodiment disclosed in FIG. 13a, the arm is a milking robot arm. The milking robot has a device for determining the position of a teat of an animal standing on the milking platform. The robot arm, including the rotation of the robot arm, is controlled in response to the position of the teat. In the embodiment disclosed in FIG. 13d, the arm is a milking robot arm mounted to a movable vehicle, which moves along the milking platform. A device is provided on the vehicle for determining the position of a teat of an animal standing on the milking platform. Furthermore, this embodiment includes a stationary rail on which a number of teatcup carriers are movable along a path extending in parallel with the outer edge of the milking platform.

WO 2008/118068 discloses another animal treating arrangement according to the second solution. The arrangement comprises a carrying device configured to be positioned beside a rotary milking platform arranged to rotate with a rotary velocity around a centre axis and having a large number of animal places arranged to house a respective animal during the rotation of the rotary milking platform. The carrying device comprises a stationary rail arranged beside the milking platform. A milking robot arm, configured to attach the teatcups to the teats of an animal on the milking platform, is movable on the rail. The milking robot arm is movable along the rail with the same velocity as the rotary velocity of the milking platform during the attachment of the teatcups.

WO 00/74472 discloses a further animal treating arrangement according to the second solution, wherein a carrying device configured to be positioned inside a rotary milking path arranged to rotate around a centre axis and having a number of animal places. The carrying device comprises a stationary rail arranged inside the rotary milking path. A milking robot arm, configured to attach the teatcups to the teats of an animal on the milking platform, is movable on the rail. The milking robot arm is movable along the rail during the attachment of the teatcups.

SUMMARY OF THE INVENTION

A disadvantage of the second solution is the difficulty to adapt the movements of the milking robot not only to the animal but also to the rotary movement of the platform.

The object of the present invention is to provide an animal treating arrangement by means of which the above mentioned problems are remedied.

This object is achieved by the animal treating arrangement initially defined, which is characterized in that it comprises a sensor communicating with the control unit and configured to sense an instantaneous value of the milking platform velocity, and that the control unit is configured to control the first drive member to move the support platform to follow the rotary milking platform from a start position to an end position during a part of the rotation of the rotary milking platform.

Such a carrying device can be fixed to the ground by the fundament. The carrying device according to the invention supports a support platform on which an automatic handling device, such as a milking robot can be disposed. Since the support platform follows the rotary milking platform from a start position to an end position it is possible to let the milking robot act as if it is stationary in relation to the animal place on the rotary milking platform. The milking robot may thus be configured as a milking robot provided in a stationary manner beside a stationary milking place. No additional features of the milking robot are needed, but a general milking robot can be used and arranged on the support platform of the carrying device.

According to an embodiment of the invention, the control unit is configured to control the first drive member in such a way that the second axis intersects the one and same radial line of the rotary milking platform during said part of the rotation of the rotary milking platform. The first drive member is thus provided to ensure that the centre of the support platform during the part of the rotation of the rotary milking platform is moved with the same, or exactly the same, angular velocity with respect to the centre axis of the rotary milking platform. The radial line may be a centre line of one of the milking places, or a radial line beside the centre line. The latter possibility is advantageous in case the animal does not stand in the middle of the milking place.

According to an embodiment of the invention, the carrying device comprises a second bearing device connected to the arm and permitting the support platform to rotate in relation to the arm around the second axis, wherein the drive arrangement comprises a second drive member communicating with the control unit and arranged to rotate the support platform around the second axis. Advantageously, a diametrical direction of the support platform intersects the second axis perpendicular to the second axis, wherein the control unit is configured to control the second drive member to rotate the support platform in such a way that the diametrical direction of the support platform during said part of the rotation of the rotary milking platform forms a determined angle with the one and the same radial line of the rotary milking platform. Advantageously, the determined angle is zero, i.e. the diametrical direction of the support platform coincides with the one and same radial line of the rotary milking platform. The second drive member is thus provided to ensure that the support platform, and thus the milking robot, during the part of the rotation of the rotary milking platform always has the same direction in a horizontal plane with respect to the centre axis of the rotary milking platform. The diametrical direction of the support platform may also be inclined with a certain angle in relation to the one and the same radial line of the rotary milking platform especially in case the animal is not standing straight along a radial line extending through the milking place.

According to an embodiment of the invention, the drive arrangement comprises a third drive member communicating with the control unit and connected to the arm, wherein the control unit is configured to control the third drive member in such a way that the second axis during the part of the rotation of the rotary milking platform is located at a determined distance from the centre axis of the rotary milking platform. The third drive member is thus provided to ensure that the distance from the milking robot to the animal place is determined or constant during the part of the rotation of the rotary milking platform. The determined distance may be different for different milking places of the rotary milking platform depending on the length of the animal present in the milking place.

According to an embodiment of the invention, the arm comprises a first arm element connected to the first bearing device and a second arm element connected to the first arm element via a third bearing device permitting the second arm element to rotate in relation to the first arm element around a third axis extending in parallel with the first axis and the second axis. Advantageously, the third drive member is arranged to rotate the second arm element around the third axis, thereby maintaining the second axis during the part of the rotation of the rotor milking platform at said determined distance from the centre axis of the rotary milking platform.

According to an embodiment of the invention, the part of the rotation of the rotary milking platform has a length that corresponds to a peripheral length of one of the animal places.

According to an embodiment of the invention, the control unit is configured to control the drive arrangement to return the support platform from the end position to the start position after the movement along the part of the rotation of the rotary milking platform. The drive arrangement may be configured to return the support platform along the same path as during the movement along the part of the rotation. However, it is also possible to return the support platform along another path, for instance at a greater distance from the centre axis of the rotary milking platform.

According to an embodiment of the invention, the support platform is configured to carry an automatic handling device. The automatic handling device may be configured to provide a spray nozzle for spraying a solution to a teat of an animal present in one of the animal places on the rotary milking platform or configured to attach a treatment cup to a teat of an animal present in one of the animal places on the rotary milking platform. Advantageously, the automatic handling device may comprise a base member mounted on the support platform and a robot arm configured to attach the treatment cup to the teat. Furthermore, the automatic handling device may comprise a teat sensor configured to sense the position of the teat and a control device configured to control the robot arm in response to the teat sensor.

According to an embodiment of the invention, a magazine is provided on the rotary milking platform, wherein the robot arm is configured to grip the treatment cup from the magazine and then to attach the treatment cup to the teat of the animal.

According to an embodiment of the invention, the treatment cup is a teatcup of a milking unit provided on the rotary milking platform.

According to another embodiment of the invention, the treatment cup is a teat-cleaning cup.

According to an embodiment of the invention the arrangement may comprise the rotary milking platform.

BRIEF DESCRIPTION OF THE DRAWINGS

The present invention is now to be explained by a description of preferred embodiments and with reference to the drawings attached here to.

DETAILED DESCRIPTION OF VARIOUS EMBODIMENTS OF THE INVENTION

An animal treating arrangement according to the present invention will now be described with reference to FIGS. 1-4. The animal treating arrangement shown in FIG. 1 comprises two carrying devices 1 provided beside a rotary milking platform P. It is to be noted that the animal treating arrangement also may comprise only one or more than two such carrying devices 1. The design of such a carrying device is shown more closely in FIGS. 2-4.

The rotary milking platform P may be comprised by the animal treating arrangement, or the carrying device or carrying devices of the animal treating arrangement may be configured to be positioned beside the rotary milking platform P and co-operate with the rotary milking platform P in a manner to be described below.

The rotary milking platform P is arranged to rotate with a milking platform velocity around a vertical centre axis x of the rotary milking platform P. A suitable drive arrangement (not disclosed) is provided for rotating the rotary milking platform P at a constant milking platform velocity or a varying milking platform velocity. The rotary milking platform P has a plurality of animal places 2, such as more than 12 animal places 2, arranged to house a respective animal during the rotation of the rotary milking platform P. Each animal place 2 has a peripheral length l. The rotary milking platform P has or defines an infinite number of radial lines r, each extending perpendicularly from the centre axis x in a radial direction.

Figure 1:
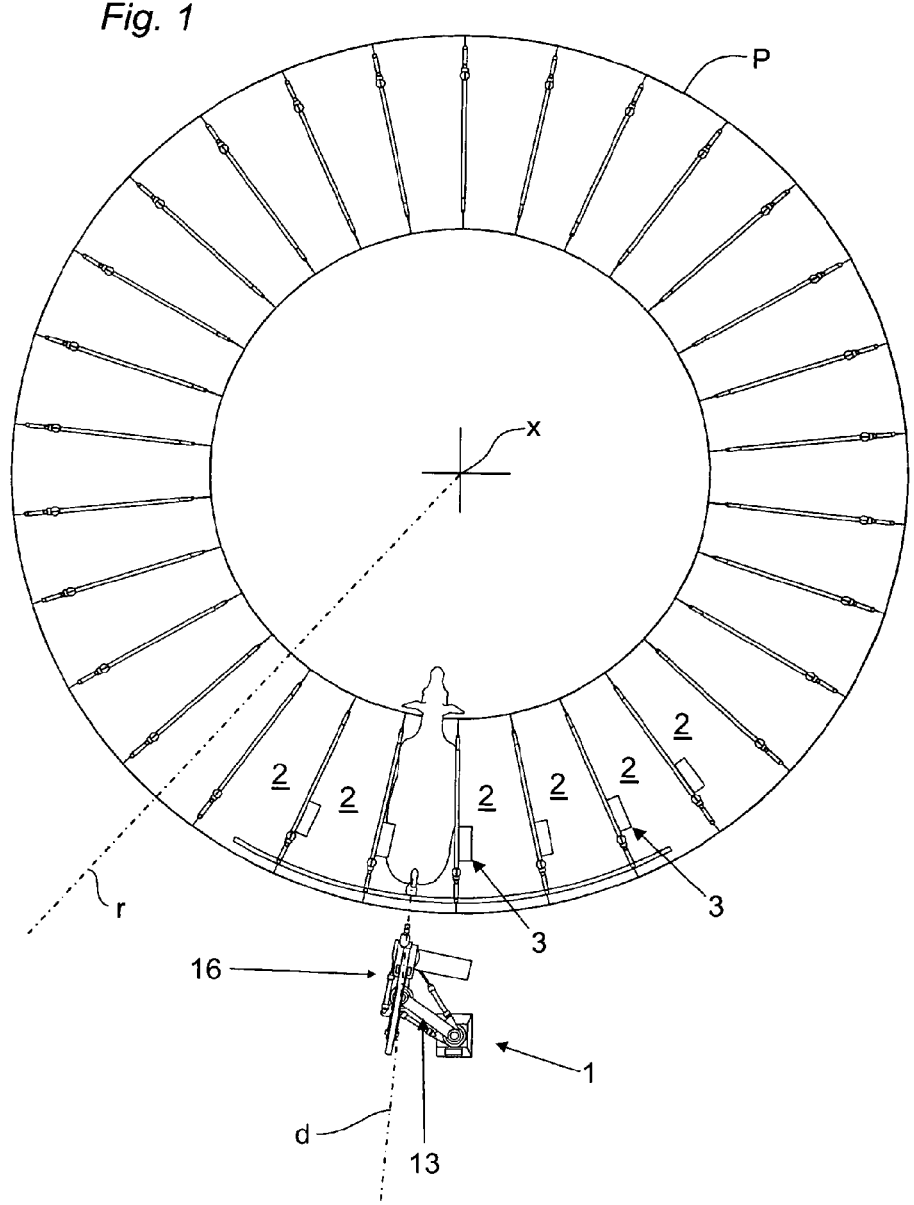
FIG. 1 shows a view from above of an animal treating arrangement according to the present invention.
Figure 2:
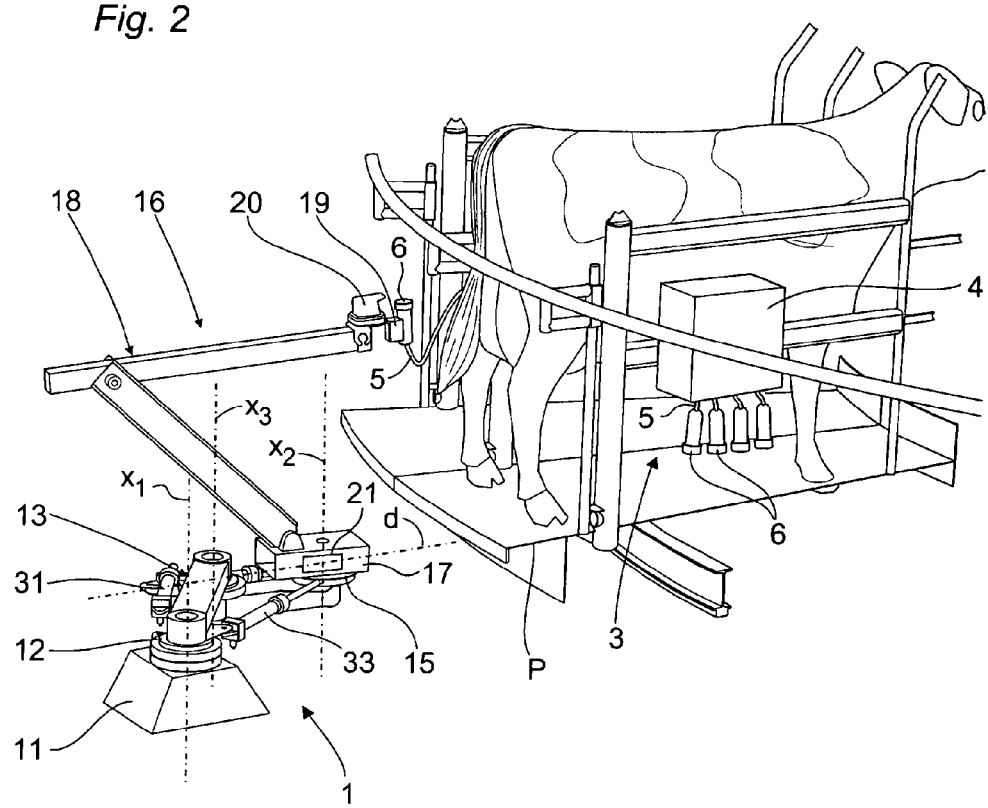
FIG. 2 discloses a perspective view of a part of the arrangement in FIG. 1.

A milking unit 3, see FIG. 2, is provided at each, or substantially each, animal place 2 on the rotary milking platform P. The milking unit 3 is, in a manner known per se, connected to a vacuum source and suitable milk collecting containers (not shown). The milking unit 3 also comprises a magazine 4, such as a teatcup magazine, and four milk lines 5 each carrying a teatcup 6. It is to be noted here that the teatcup 6 could be any kind of treatment cup, i.e. not only a teatcup 6 for milking of the animal, but also a fore-milking cup or a teat-cleaning cup for cleaning and massaging and possibly also fore-milking the animal. The magazine 4 shown in FIG. 2 can also illustrate these possibilities wherein the treatment cup is a teat-cleaning cup or a fore-milking cup.

The carrying device 1 comprises a fundament 11 to be provided on the ground, or the floor, in a stationary manner. The fundament 11 may thus be a stationary fundament. The fundament 11 may also be movable in relation to the ground. In this case the fundament 11 comprises means permitting locking of the fundament to the ground so that it is stationary in relation to the ground. Advantageously, the fundament may be mounted to a rail (not shown) extending in the radial direction along on of the radial lines r so that the distance between the fundament 11 and the rotary milking platform P can be adjusted. Locking means (not shown) are the provided for locking the fundament 11 at a desired distance from the rotary milking platform P.

The carrying device 1 also comprises a first bearing device 12, provided on the fundament 11, and an arm 13 connected to the first bearing device 12, which permits the arm 13 to rotate in relation to the fundament 11 around a first axis $x_1$. The first axis $x_1$ extends in parallel, or substantially in parallel, with the centre axis x of the rotary milking platform P.

Moreover, the carrying device 1 comprises a support platform 15, which is connected to the arm 13 and configured to carry an automatic handling device 16. The automatic handling device 16 is configured to attach the teatcups 6 of the milking unit 3 to an animal present in one of the animal places 2 on the rotary milking platform P. The automatic handling device 16 can be configured or designed as a so called milking robot of a general kind. The automatic handling device 16 comprises a base member 17, positioned on and/or mounted on the support platform 15, and a robot arm 18 configured to attach the teatcup 6 to the teat. The robot arm 18 has a gripping member 19 at the distal end thereof for gripping the teatcup 6. Furthermore, the robot arm 18 carries a teat sensor 20 such as a video camera or any other suitable sensor. The teat sensor 20 is configured to sense the position of the teat of the animal present at the animal place 2 of the rotary milking platform P. The automatic handling device 16 also comprises a control device, schematically indicated at 21. The control device 21 is configured to control the robot arm 18 and the gripping member 19 in response to the teat sensor 20. It is to be noted that the automatic handling device 16 also may provide a spray nozzle (not disclosed) configured to spray a suitable disinfectant solution to the teat after the milking has taken place. The spray nozzle may be gripped and held by the gripping member 19, or may be a part of the robot arm 18 of the automatic handling device 16.

Figure 3:
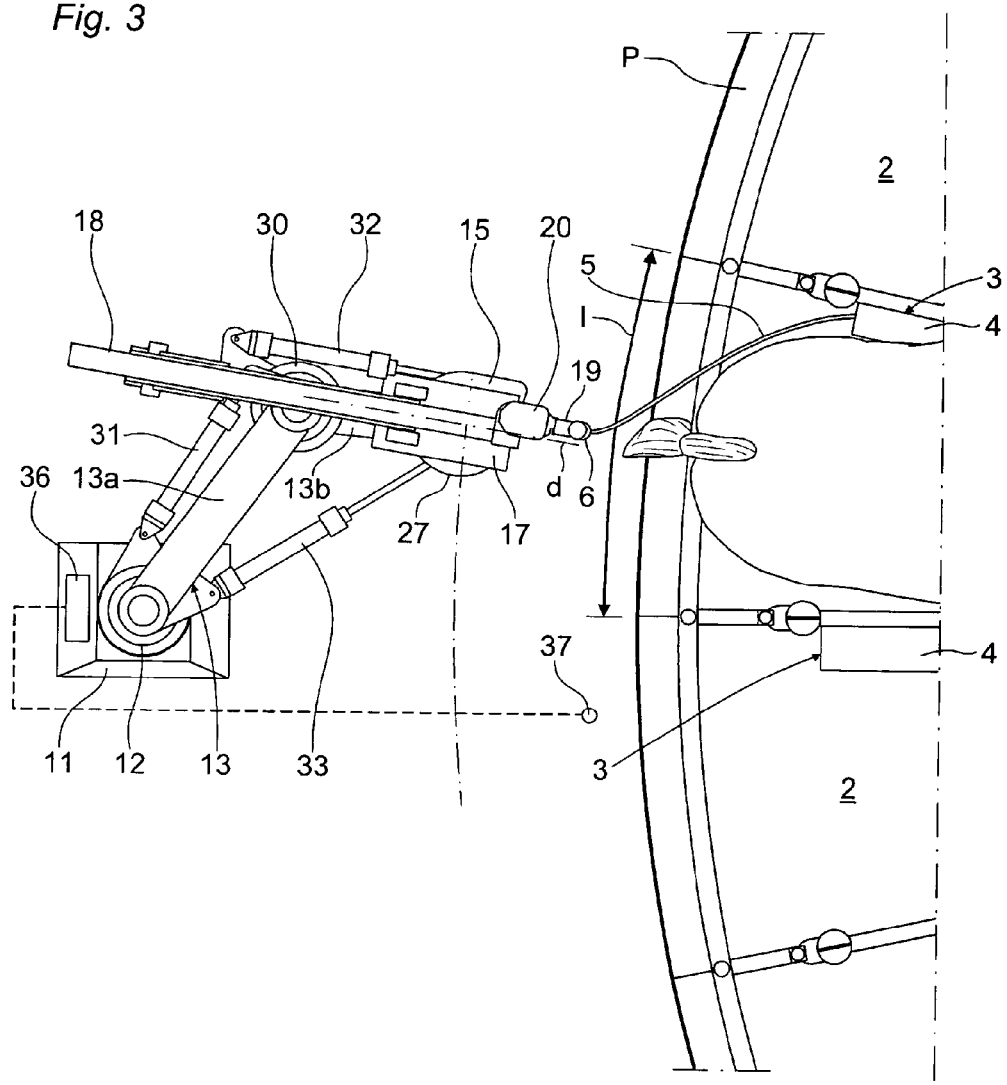
FIG. 3 discloses a view from above of a part of the arrangement in FIG. 1.
Figure 4:
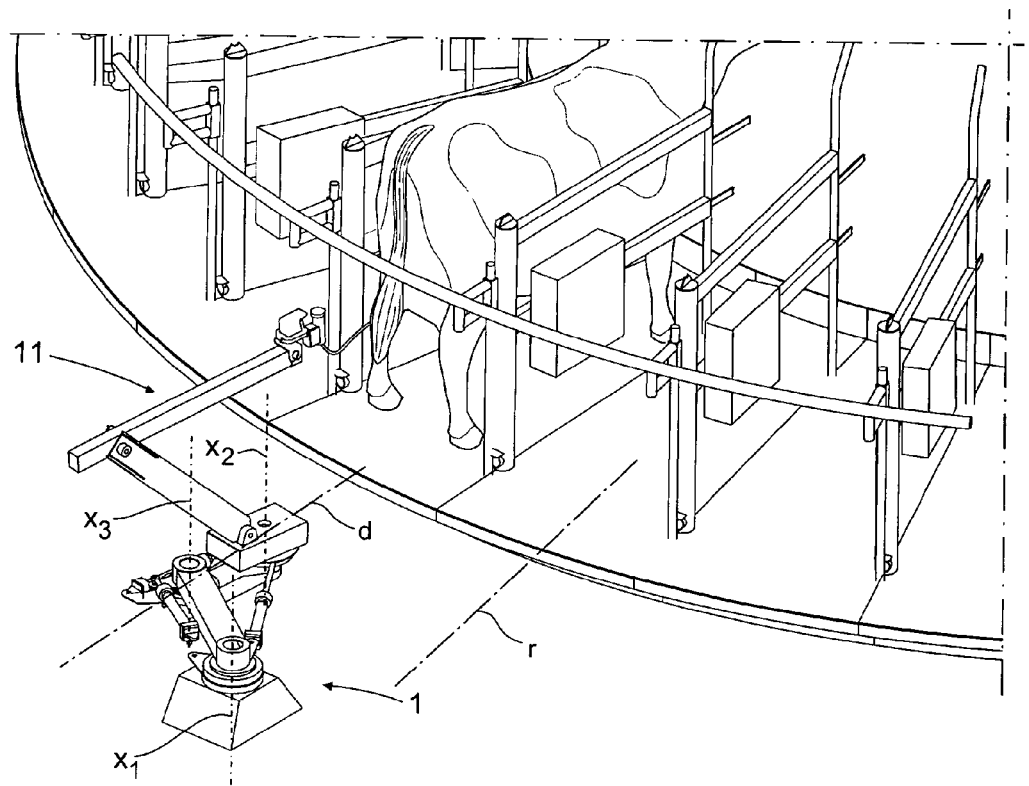
FIG. 4 discloses a perspective view of a part of the arrangement in FIG. 1.

The carrying device 1 also comprises a second bearing device 27 connected to the arm 13 and permitting the support platform 15 to rotate in relation to the arm 13 around a second axis $x_2$. The second axis $x_2$ extends in parallel, or substantially in parallel, with the first axis $x_1$ and the centre axis x. The second bearing device 27 is, as can be seen in FIG. 3, provided at the outer end of the arm 13 and supports the support platform 15 in a rotary manner.

The arm 13 comprises a first arm element 13a connected to the first bearing device 12, and a second arm element 13b carrying the second bearing device 27. The first arm element 13a and the second arm element 13b are connected to each other via a third bearing device 30 permitting the second arm element 13b to rotate in relation to the first arm element 13a around a third axis $x_3$. The third axis $x_3$ extends through the third bearing device 30 and in parallel with, or substantially in parallel with, the first axis $x_1$, the second axis $x_2$ and the centre axis x.

The support platform 15 has or defines a diametrical direction d, which intersects the second axis $x_2$ perpendicularly to the second axis $x_2$. The support platform 15 also has or defines an attachment surface or attachment member on which the automatic handling device 16 is provided or mounted. The attachment surface may, for instance, be formed by an upper, plane surface. Such a plane surface may extend in parallel with a horizontal plane.

The carrying device 1 also comprises a drive arrangement 31, 32, 33 configured to move the support platform 15. The drive arrangement 31, 32, 33 comprises a first drive member 31 connected to the fundament 11 and the arm 13, and arranged to rotate the arm 13 around the first axis $x_1$. The drive arrangement 31, 32, 33 also comprises a second drive member 32 connected to the arm 13 and the support platform 15, and arranged to rotate the support platform 15 around the second axis $x_2$. Furthermore, the drive arrangement 31, 32, 33 comprises a third drive member 33 connected to the first arm element 13a and the second arm element 13b, and arranged to rotate the second arm element 13b around the third axis $x_3$.

The animal treating arrangement comprises a control unit schematically indicated at 36, and a sensor schematically indicated at 37. The sensor 37 communicates with the control unit 36. The sensor 37 is configured to sense an instantaneous value of the milking platform velocity. The sensor 37 can be of any suitable kind, for instance an optical sensor reading an optical pattern provided on the rotary milking platform P or a sensor connected to the drive arrangement for the rotary milking platform P.

The control unit 36 also communicates with the drive arrangement, and more specifically with the first drive member 31, the second drive member 32 and the third drive member 33. It is to be noted that the control unit 36 also may communicate with the teat sensor 20 so that the position of the animal in the milking place 2 may be taken into account for controlling the drive arrangement 31, 32, 33 of the carrying device 1.

The control unit 36 is thus configured to control the first drive member 31 to rotate the arm 13 around the first axis $x_1$, to control the second drive member 32 to rotate the support platform 15 around the second axis $x_2$ and to control the third drive member 33 to rotate the second arm element 13b in relation to the first arm element 13a around the third axis $x_3$.

More specifically, the control unit 36 is configured to control the first drive member 31 to rotate the arm 13, and thus to move the support platform 15, to follow the rotary milking platform P during its rotation from a start position to an end position during a part of the rotation of the rotary milking platform P. The part of the rotation of the rotary milking platform P has a length, or an extension, that corresponds to the peripheral length l of each of the animal places 2. In such a way the second axis $x_2$ will intersect the one and the same radial line r of the rotary milking platform P during the part of the rotation of the rotary milking platform P, i.e. during the rotation from the start position to the end position. The selection of the radial line may be predetermined, for instance the centre line of the milking place 2, or made depending on the animal present in the milking place 2, wherein the control unit 36 may be configured to receive an animal position signal from the teat sensor 20. Consequently, thanks to the movement produced by the first drive member 31, the distance from the support platform 15 to the teats of the animal will be substantially constant during the part of the rotation of the rotary milking platform P when the teatcups 6 are to be attached to the teats of the animal at the animal place 2.

The control unit 36 is configured to control the second drive member 32 to rotate the support platform 15 in such a way that the diametrical direction d of the support platform 15 during the part of the rotation of the rotary milking platform P coincides, or forms a determined angle, with the one and the same radial line of the rotary milking platform P. In such a way, the automatic milking device 16 will have a constant direction or orientation in relation to the animal at the milking place 2 during the part of the rotation of the rotary milking platform P, i.e. from the start position to the end position. The diametrical direction may advantageously coincide with the one and the same radial line, i.e. the determined angle is predetermined as zero. In case the animal does not stand straight in the milking place, it may be appropriate to let this angle deviate from zero. The angle may then be determined in response to the sensing of teat sensor 20 which may be configured sense such oblique position of the animal in the milking place 2, and to communicate the sensed position to the control unit 36.

The control unit 36 is configured to control the third drive member 33 to rotate the second arm element 13b in relation to the first arm element 13a around the third axis $x_3$ so that the second axis $x_2$ will be maintained at a constant distance from the centre axis x of the rotary milking platform P during the part of the rotation of the rotary milking platform P, i.e. from the start position to the end position. In such a way, the distance from the automatic handling device 16 to the teats of the animal will be substantially constant during the part of the rotation of the rotary milking platform P. The distance may be predetermined, or determined depending on for instance the length of the animal present in the milking place 2, wherein the length of the animal may be sensed and communicated to the control unit 36 via the teat sensor 20.

Furthermore, the control unit 36 is configured to control the drive arrangement, i.e. the first drive member 31, the second drive member 32 and the third drive member 33, to return the support platform 15 from the end position to the start position after the movement along the part of the rotation of the rotary milking platform P. In such a way, the automatic handling device 16 will be in the same position and the same orientation with respect to the animal present at the successive animal place 2 of the rotary milking platform P.

The present invention is not limited to the embodiments described, but may be varied and modified with in the scope of the following claims.

The invention claimed is:

1. A carrying device of an animal treating arrangement, the carrying device comprising:
   a parallel rotary milking platform (P) that rotates with respect to an adjacent ground or floor surface,
   a stationary fundament (11) configured to be positioned beside, spaced-apart and separate from, an outer edge of the parallel rotary milking platform (P) on the ground surface or floor, so that the fundament remains stationary with respect to the milking platform when the milking platform is rotating, and with respect to the ground or floor surface,
   the milking platform (P) arranged to rotate with a milking platform velocity around a center axis (x) and having a plurality of animal places (2), each animal place arranged to house a respective animal during the rotation of the milking platform (P) in a position parallel to an adjacent animal in an adjacent place, the milking platform (P) having an infinite number of radial lines (r1) extending perpendicularly from the center axis (x); and
   a first bearing device (12) provided on the fundament (11), the first bearing device (12) being rotatable in relation to the fundament (11) around a fixed, first axis (x1) that is stationary with respect to the fundament (11), the milking platform when the milking platform is rotating, and with respect to the ground or floor surface;
   an arm (13) connected to the first bearing device (12), the first bearing device permitting a first end of the arm (13) to rotate in relation to the fundament (11) around a first axis (x1);
   a support platform (15) connected to a second end of the arm (13);
   a second bearing device (27) connected to the second end of the arm (13), the second bearing device (27) being i) rotatable around a second axis (x2) at least substantially parallel the first axis (x1) and ii) facilitating rotation of the support platform (15) around the second axis (x2);
   a first drive arrangement (31) connected to the fundament (11) and to the arm (13), the first drive arrangement (31) configured to rotate the arm (13) around the first axis (x1);
   a sensor (37) configured to sense a current value of the milking platform velocity;
   a control unit (36) communicating with the sensor (37) to receive the current value of the milking platform velocity and, based on the received value of the milking platform velocity, control the first drive member (31), during a part of the rotation of the milking platform (P), to move the support platform (15) to follow the milking platform (P) from a start position to an end position of a milking operation such that the first bearing device (12) rotates in relation to the fundament (11) around a fixed, first axis (x1) that is stationary with respect to the fundament (11), to the rotating milking platform, and to the ground or floor surface, while the support platform (15) remains stationary in relation to the animal place on the rotating milking platform (P) with the second axis (x2) intersecting a same radial line (r) within the animal place during said part of the rotation from the start position and continuing to the end position, the second axis maintaining a constant distance from the center axis (x) of the milking platform during said part of the rotation of the rotary milking platform from the start position continuing to the end position.

2. The carrying device of claim 1, wherein,
the support platform (15) defines a diametrical direction line (d) intersecting the second axis (x2) perpendicularly to the second axis (x2), and
said control unit (36) in controlling the first drive member (31) to move the support platform (15) to follow the milking platform (P) during said part of the rotation of the rotary milking platform from the start position and continuing to the end position, further maintains the diametrical direction line (d) i) intersecting the second axis (x2) perpendicularly to the second axis (x2) while ii) maintaining a predetermined angle with the same radial line (r) within the animal place of the rotary milking, during said part of the rotation of the rotary milking platform from the start position continuing to the end position.

3. The carrying device of claim 2, wherein,
said predetermined angle is zero so that the diametrical direction line (d) coincides with the same radial line (r) during said part of the rotation of the rotary milking platform from the start position continuing to the end position.

4. The carrying device of claim 2, further comprising:
a second drive arrangement (32) connected to the arm (13) and to the support platform (15), the second drive arrangement (32) arranged to rotate, under control of the control unit (36), the support platform (15) around the second axis (x2).

5. The carrying device of claim 4, further comprising:
a third drive arrangement (33) i) connected to the first and second ends of the arm (13) and ii) arranged to rotate, under control of the control unit (36), an intermediate point of the arm (13) around a third axis (x3) wherein,
the control unit (36) is configured to control the first drive member (31) to rotate the arm (13) around the first axis (x1), to control the second drive member 32 to rotate the support platform (15) around the second axis (x2) and to control the third drive member (33) to rotate the arm (13) in relation to the first end of the arm (13) around the third axis (x3).

6. The carrying device of claim 5, wherein the control unit (36) is configured to control the third drive member (33) to rotate the arm element (13) around the third axis (x3) so that the second axis (x2) will be maintained at the constant distance from the center axis (x) of the milking platform (P) during said part of the rotation of the milking platform (P).

7. The carrying device of claim 6, wherein,
the value of the milking platform velocity sensed by the sensor (37) is an instantaneous value of the milking platform velocity, and
the part of the rotation of the milking platform (P) has a length corresponding to a peripheral length (l) of one of the animal places (2).

8. The carrying device of claim 2, further comprising:
a third bearing device (30) rotatable around a third axis (x3), the third axis (x3) extending through the third bearing device (30) and at least substantially in parallel with, the first axis (x1), the second axis (x2) and the center axis (x), wherein,
the arm (13) comprises i) a first arm element (13a) connected to the first bearing device (12), and ii) a second arm element (13b) carrying the second bearing device (27),
the first and second arm elements (13a, 13b) are connected to each other via the third bearing device (30), the third bearing device (30) facilitating the second arm element (13b) to rotate in relation to the first arm element (13a) around the third axis (x3);
a second drive arrangement (32) connected to the arm (13) and to the support platform (15), the third drive arrangement (32) arranged to rotate, under control of the control unit (36), the support platform (15) around the second axis (x2).

9. The carrying device of claim 8, further comprising:
a third drive arrangement (33) i) connected to the first and second arm elements (13a, 13b), and ii) arranged to rotate, under control of the control unit (36), the second arm element (13b) around the third axis (x3) during said part of the rotation of the milking platform (P) to move the support platform (15) to follow the milking platform (P) from the start position to the end position such that the support platform (15) remains stationary in relation to the animal place on the rotating milking platform (P), wherein,
the control unit (36) is configured to control the first drive member (31) to rotate the arm (13) around the first axis (x1), to control the second drive member (32) to rotate the support platform (15) around the second axis (x2) and to control the third drive member (33) to rotate the second arm element (13b) in relation to the first arm element (13a) around the third axis (x3).

10. The carrying device of claim 9, wherein,
said predetermined angle is zero so that the diametrical direction line (d) coincides with the same radial line (r) during said part of the rotation of the rotary milking platform from the start position continuing to the end position.

11. The carrying device of claim 9, wherein the control unit (36) is configured to control the third drive member (33) to rotate the second arm element (13b) in relation to the first arm element (13a) around the third axis (x3) so that the second axis (x2) will be maintained at the constant distance from the center axis (x) of the milking platform (P) during said part of the rotation of the milking platform (P).

12. The carrying device of claim 11, wherein,
the value of the milking platform velocity sensed by the sensor (37) is an instantaneous value of the milking platform velocity, and
the part of the rotation of the milking platform (P) has a length corresponding to a peripheral length (l) of one of the animal places (2).

13. The carrying device of claim 2, wherein,
the value of the milking platform velocity sensed by the sensor (37) is an instantaneous value of the milking platform velocity, and
the part of the rotation of the milking platform (P) has a length corresponding to a peripheral length (l) of one of the animal places (2).

14. The carrying device of claim 1, further comprising:
an automatic handling device (16) carried on the support platform (15), the automatic handling device (16) configured to attach teatcups of a milking unit to teats of the animal housed in the animal place during said milking operation.

15. The carrying device of claim 1, further comprising:
an automatic handling device (16) carried on the support platform (15), the automatic handling device (16) configured to provide a spray nozzle for spraying a solution to a teat of an animal present in the animal place (2) on the milking platform (P) during said milking operation.

16. The carrying device of claim 1, further comprising:
an automatic handling device (16) carried on the support platform (15), the automatic handling device (16) configured to attach teatcups of a milking unit to teats of the animal housed in the animal place during said milking operation; and
a teat sensor (20) configured to sense a position of each teat and to control the automatic handling device (16) in response to the sensed teat position.

17. The carrying device of claim 1 in combination with the milking platform.

* * * * *